310-14 SR

FIP8502 OR 3,219,854

SEARCH ROOM

LINEAR ACTUATOR AND CONVERTER

Filed March 29, 1963 2 Sheets-Sheet 1

INVENTOR.

HAROLD J. McLAUGHLIN

BY

Bower & Patalidis

ATTORNEYS

Nov. 23, 1965 H. J. McLAUGHLIN 3,219,854

LINEAR ACTUATOR AND CONVERTER

Filed March 29, 1963 2 Sheets-Sheet 2

INVENTOR.
HAROLD J. McLAUGHLIN
BY
Bower & Patalidis
ATTORNEYS

United States Patent Office 3,219,854
Patented Nov. 23, 1965

3,219,854

LINEAR ACTUATOR AND CONVERTER

Harold J. McLaughlin, Dearborn, Mich., assignor to Ex-Cell-O Corporation, Detroit, Mich.

Filed Mar. 29, 1963, Ser. No. 269,052
11 Claims. (Cl. 310—14)

This invention relates to improvements in linear actuators, and more particularly relates to servo-mechanisms for linearly positioning a shaft by electric solenoid means in response to selective input signals.

In the art of data processing, digital computers, machine-tools, automation, and the like, there exists a need for devices which accurately position a shaft or a movable reference output element in response to information applied to the input of the device. Various servo-mechanisms of this nature have been proposed; they may be actuated by electrical means or by purely mechanical means. It is an object of this invention to provide a linear shaft actuator and positioner which is selectively operated by electric solenoid means.

The transmission of control information in systems of the character herein mentioned is commonly carried out in the binary numerical system. It is frequently desirable to convert the digital representation of the binary number into an analogue equivalent such as the linear position of a movable reference output element or an angular shaft rotation. It is, therefore, another object of this invention to provide selectively operable electric solenoid means for converting binary information into an analogue equivalent in the form of a linear shaft position. It is apparent to those skilled in the art that such an analogue linear displacement and positioning can be easily converted, in applications where so desired, into an angular shaft rotation and positioning through a simple rocker arm assembly, rack and pinion assembly, or the like.

It is a further object of this invention to provide a compact, self contained, electric solenoid powered binary to linear shaft position converter.

It is another object of this invention to provide a linear actuator utilizing a relatively small number of simple elementary parts in order to reduce manufacturing cost and inventory.

It is an additional object of this invention to provide a linear actuator developing moderate power with practically no lag in operation and almost instantaneous response.

It is a further object of this invention to provide a linear actuator having a number of discrete positions which correspond to the formula $N=2n$, in which N denotes the number of discrete positions and $n$ denotes the number of individual units or stages being placed in series within a common housing. For example, if it is desired to provide for 8 different discrete positions of the output reference element, the number of unit elements or stages to be used is 3; if 128 discrete positions are required, 7 unit elements or stages must be placed within the housing.

A further object of this invention is to have a predetermined number of discrete positions which are accurately repeatable ad infinitum, together with positive indexing at each discrete position.

Another object of the invention is to provide a functional unit endowed with high reliability and long life.

Additional objects and advantages of the invention will become apparent from the following description and appended claims, taken in conjunction with the accompanying drawings, which disclose, by way of example, the principles of this invention and the best mode which has been contemplated for applying these principles.

Figure 1:
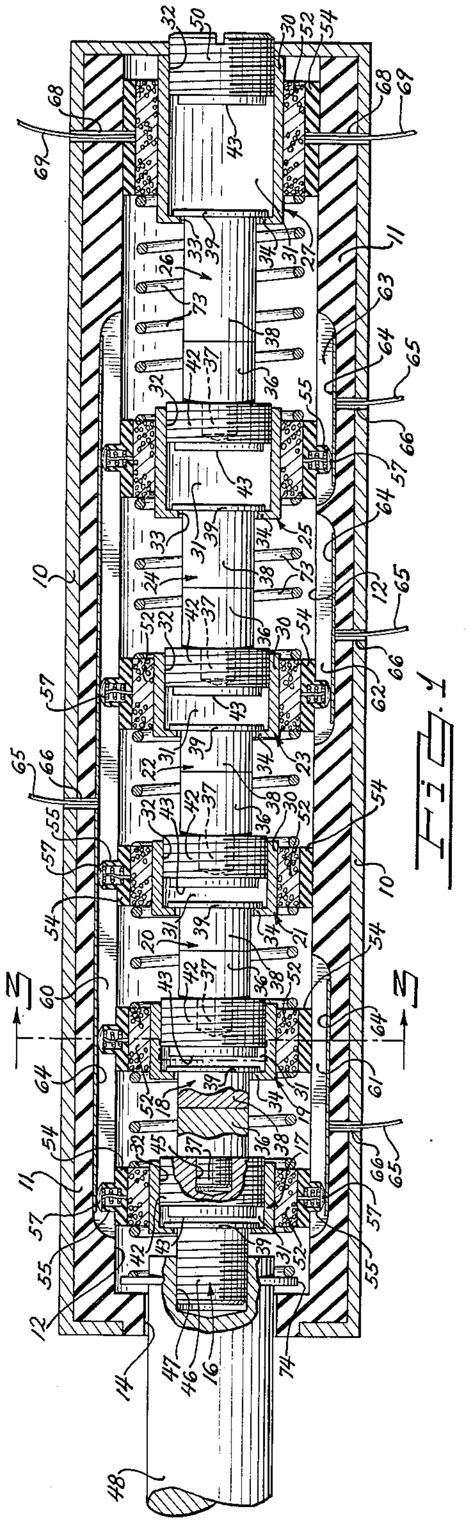
FIGURE 1 is a longitudinal sectional view of an apparatus according to the invention showing the stages of the apparatus of the invention in a fully extended position.

The invention consists in general of a cylindrical stationary housing having a longitudinal bore. The bore contains a plurality of slidable plunger-core assemblies or stages which are connected in series to each other, and which have one end fixed to the housing and the other end attached to an output shaft. Each core has wound about it a solenoid coil for the purpose of actuating the appropriate plunger when energized.

All the plunger-core assemblies are loaded by biasing means toward their extended position so that when all solenoids are in a de-energized state the output shaft is at its point of maximum extension. Thus, when a solenoid is energized, the corresponding plunger is retracted into its core and, consequently, the output shaft is displaced inwardly of an amount equal to the stroke of the plunger. In this way, each plunger displaces the output shaft the exact amount of that plunger stroke and any combination of plungers displaces the output shaft the sum of the plunger strokes being utilized. In the structural embodiment shown in the drawings, the stroke of each plunger has been chosen arbitrarily to be twice the stroke of the immediately preceding plunger. In this fashion, with six plunger-core assemblies or stages available, there are 26 or 64 discrete positions available at the output, including the fully extended position.

Figure 3:
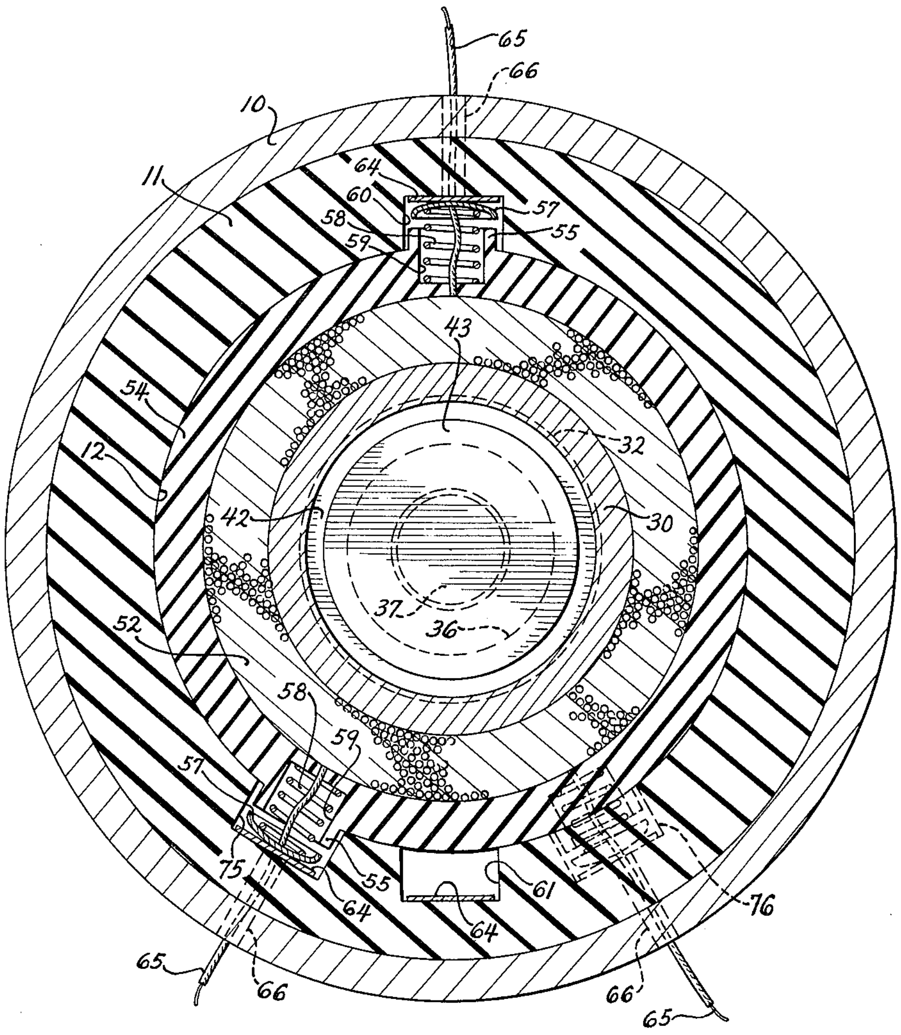
FIGURE 3 is a cross-sectional view of the apparatus of FIGURES 1 and 2, taken along line 3—3 of FIGURE 1, and shown at an enlarged scale.

Referring now to the drawings, and more particularly to FIGURES 1 and 3 thereof, a cylindrical outer housing 10, made of a magnetic material, such as soft iron, nickel-iron alloys and the like, surrounds a non-magnetic inner housing 11, made of material such as hard rubber or plastic. The inner housing has a longitudinal bore 12 open on both ends and containing six interconnected plunger-core assemblies or stages that are designated generally by numerals 16, 18, 20, 22, 24, and 26 referring to the plunger portions, and by numerals 17, 19, 21, 23, 25, and 27 referring to the corresponding core portions.

Each core comprises a hollow cylindrical member 30, made of magnetic material similar to the material of the outer housing 10, provided with a bore 31 presenting a threaded portion 32 on one end into which is frictionally engaged a plug 42 presenting a flat surface 43 disposed towards the inside of the core. The other end of the hollow cylindrical member 30 has a reduced diameter portion 33 formed by inwardly disposed integral shoulder 34.

Slidably disposed in each core is a plunger which consists of a non-magnetic cylindrical portion 36, made of material such as copper or the like having a reduced diameter threaded end 37 screwed in a threaded hole 45 in the plug 42, and a magnetic cylindrical portion 38 bonded, welded or otherwise fastened to the non-magnetic portion 36. The magnetic portion 38 of the plunger presents on its free end an integral shouldered flange 39 disposed within the bore 31 of the core cylindrical member 30 and adapted to normally abut against the core shoulder 34.

An output member 48 is slidably disposed through an appropriate opening 14 in one end of the housing and the first plunger member 16 is adapted to be fastened directly to the output member by means of a reduced threaded portion 46 of the plunger member screwed in a threaded bore 47 of the output member. On the other end of the housing, the core 27 is fixedly fastened to the housing and is closed by a plug 50 threading into the threaded portion 32 of the core.

Wound about and fixed to each magnetic core is an electric solenoid coil 52 of conducting magnet wire. The length and number of turns of wire necessary in each coil to generate the required magnetic force may be calculated by methods well known to the art. Protecting each solenoid coil is a layer 54 of a non-magnetic material that is cylindrical in form and slightly smaller in diameter than the main bore 12 of the inner housing so as to allow all but the fixed core 27 to slide freely in the main bore.

Figure 2:
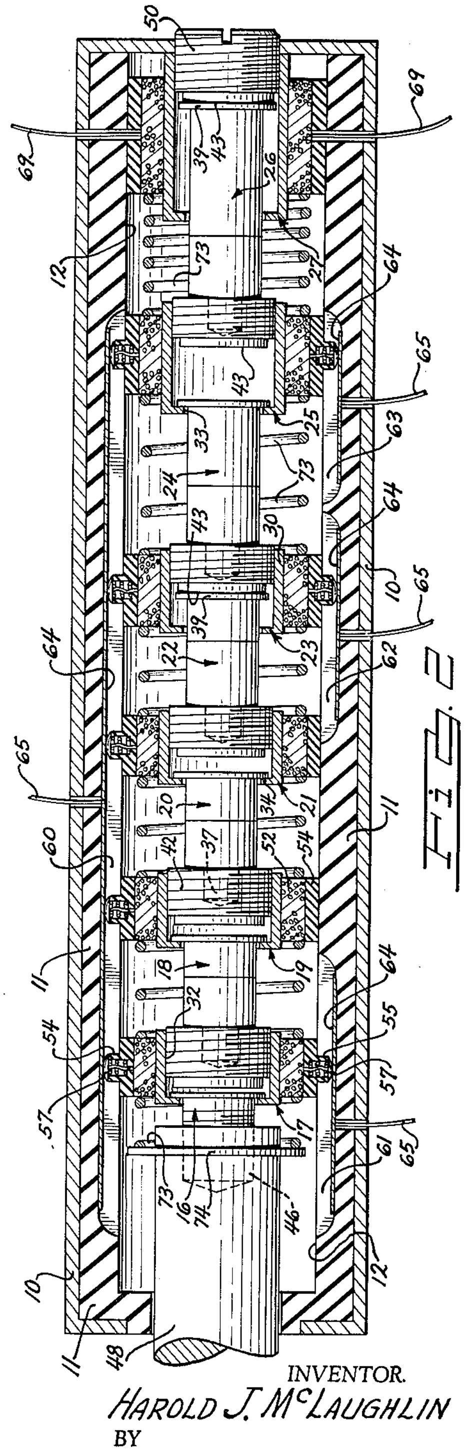
FIGURE 2 is a longitudinal sectional view of the example of FIGURE 1 showing some of the stages in a retracted position and other stages in a fully extended position.

Two electric connections are necessary for each solenoid coil 52 so that each coil may be energized separately. In order to accomplish this, the non-magnetic layer 54 on all but the fixed coil is provided with two protruding nubs 55, into each of which is disposed a lead wire from the solenoid coil. Referring now to the enlarged sectional view of FIGURE 3, each coil lead wire is attached at the outer nub surface to a small contact plate 57 which is lightly spring loaded from behind by a small coil spring 58 compressed in a hole 59 in the nub. In FIGURES 1 and 2 several of the nubs are not shown since they are disposed about their respective coils at varied angular positions as is shown in FIGURE 3 and as will be explained hereinafter.

To accommodate the nubs, the inner housing 11 is provided with a number of shallow channels such as 60, 61, 62, and 63 shown in FIGURE 1 and channels 75 and 76 shown in FIGURE 3, in which the nubs can easily slide. In the bottom of each channel is a metallic contact strip 64 unto which the spring loaded contact plate 57 of each nub presses. Each contact strip 64 is connected by a lead wire 65, that passes through an aperture 66, to a selector switch (not shown). The lead wires 69—69 for the coil of the fixed core 27 pass directly through apertures 68 disposed in the housing.

The long channel 60, with contact strip 64 disposed in the bottom thereof, acts as the common electrical terminal for all the movable solenoid coils. The second terminal for the coil of core 17 is the contact strip 64 in channel 61, and the second terminal for the coils of cores 19, 21, 23 and 25 are the contact strip in channels 76, 62 and 63, respectively, each channel being long enough to accommodate the maximum displacement of each individual coil-core assembly. Since these individual channels would overlap if all the coil nubs were in the same angular position, the nubs and their corresponding channels are placed at varied angular positions about the inner housing as is best shown in FIGURE 3. With this type of arrangement of nubs and channels, there is no problem with overlapping of the possible coil positions, and each coil may make continuous electric contact and be energized at any point in its displacement.

When all of the solenoid coils are de-energized, it is desired that the output member 48 be maintained at its maximum extended position projecting from the housing. To effect this condition, helical coil springs 73, of strength slightly less than the pulling force capable of being exerted by an energized solenoid, are disposed about the plungers and cores between adjacent plunger-core assemblies or stages. As shown in FIGURE 1, the springs abut against the sides of the solenoid coils so as to force them and their respective stages apart, with the shouldered flange 39 of each plunger member in abutting engagement with the shoulder 34 of its corresponding core. In order to accomplish this biasing action at the output end, an annular member 74 is provided on the output member 48 as a stop for the coil spring 73 that acts between the annular member 74 and the adjacent core 17. When a coil is energized, the force of the corresponding spring is readily overcome and the plunger is pulled into the core, until the shouldered flange 39 engages the plug flat surface 43.

In the de-energized state every single plunger-core assembly or stage is maintained in its extended position by the biasing force of the helical coil springs between the stages as explained hereinbefore and as represented in FIGURE 1. When it is desired to actuate or retract a single stage, an electric current of the proper voltage is applied to the appropriate coil. In accordance with the well known principles of solenoids, the magnetic field emanating from the coil passes through the low reluctance path of the magnetic core 30 and plug 42, and exerts a strong pulling force on the magnetic portion 38 of the appropriate plunger. This magnetic force overcomes the biasing action of the spring 73 and pulls the plunger into the core and holds it firmly with its shoulder flange 39 abutting against the flat surface 43 of the plug. The magnetic field emanating from a coil is prevented from acting on the plungers of adjacent stages by the magnetic insulating effect of the non-magnetic portion of the plunger and of the non-magnetic inner housing 11. The outer housing 10 is made of a magnetic material so that it will act as a low reluctance path for any stray magnetic field and prevent any deleterious effects on other electronic equipment in the vicinity.

The fully extended position of the output member 48 as shown in FIGURE 1 may arbitrarily be chosen to be position 0 which has a binary equivalent 000000. The fully retracted position may arbitrarily be chosen to be position 63 (binary 111111). In position 0 no plunger-core assembly or stage is energized and the device is maintained in its fully extended position by the biasing action of the coil springs 73 between the stages. In the position 63, all of the solenoids are energized, and the device is maintained in its fully contracted position, with the output member 48 forced to travel into the housing of a distance which is the sum of all the plunger strokes. If $a$ is the stroke of plunger 16, $b$ the stroke of plunger 18, $c$ the stroke of plunger 20, $d$ the stroke of plunger 22, $e$ the stroke of plunger 24, and $f$ the stroke of plunger 26, the distance traveled by the output member 48 is $a+b+c+d+e+f$. In the example shown, $b$ is chosen twice the stroke $a$, $c$ twice the stroke $b$, $d$ twice the stroke $c$, $e$ twice the stroke $d$, and $f$ twice the stroke $e$. These respective strokes can be easily and accurately set by screwing plugs 42 and 50 of the required amount into or out of their respective cores and by immobilizing the plug at the proper position by means of radial set screws in the core (not shown).

It can thus be seen that, by operating a control switch (not shown), any of the plunger-core stages can be selectively actuated to cause the output member 48 to travel to a position which is the analogue equivalent of any binary number between 0 and 63. For example FIGURE 2 shows the actuator in the arbitrarily chosen position 40 which has the binary equivalent 101000. Plunger 26, having been actuated, has traveled the distance of its stroke $f$. This in turn has caused cores 17, 19, 21, 23 and 25 to travel the same distance. Plunger 22, having also been actuated, has traveled the distance of its stroke $d$, causing in turn cores 17, 19, and 21 to travel the distance $d+f$. Therefore, the output shaft 48 has traveled a distance $d+f$ and the position of the output shaft now represents the analogue of number 40.

Although the example of an apparatus according to the invention has been generally shown with a stationary housing and a movable output member, it is evident that the output member could be maintained stationary and the housing could be allowed to move, without departing from the scope and spirit of the invention.

Although the illustrated embodiment has also been shown with the least significant, or smallest, digit stage connected to the output member while the most significant digit stage is shown connected to the housing, it is obvious that this arrangement could be reversed, or if so preferred, any order of digit stages could be used. It is also obvious that the device could be nonbinary, and the ratio between stage strokes could be chosen as best fitting the purpose intended for the apparatus.

For some special applications, several of such actuators, as herein described and illustrated could be placed in series, in opposition, or in parallel. For example, the output member of one actuator could be connected to the housing of another actuator in order to give a maximum resultant stroke which is the sum of the maximum strokes of each individual actuator. Two actuators could be placed in a common housing with two output members movable through both ends of the housing.

The above examples are given only for illustrative purposes to suggest a few of the possible combinations contemplated and it will be apparent to those skilled in the art that there is a great number of such possible combinations.

It is also obvious that various changes, additions, and omissions of elements may be made in details within the scope and spirit of the invention, and it is, therefore, to be understood that the invention is not to be limited to the specific details, example, and preferred embodiment shown and described.

What is claimed is:

1. A linear actuator comprising: a housing having a bore open on one end and closed at the other end; an output member adapted to be slidable through the open end of the bore; a plurality of linearly expansible stages linked end-to-end within the bore intermediate the closed end and the output member; means for limiting the linear extension and contraction of each of the expansible stages; means causing the movement of any one of the stages to result in a corresponding linear displacement of the next consecutive stage; means transmitting the linear displacement of the last expansible stage to the output member whereby the linear displacement of said output member is the sum of the linear displacements of the individual stages; means for applying a biasing force in the direction that extends the expansible stages; electric solenoid means about each stage; and switching means connecting said solenoid means selectively to a source of electric current whereby said expansible stages are contracted against the biasing force.

2. A linear actuator as claimed in claim 1 wherein the means limiting the linear contraction of the expansible stages allows each individual stage to contract twice the amount of the next preceding stage.

3. A linear actuator as claimed in claim 1 in which the means for applying a force in the direction that extends the expansible stages is a spring.

4. A linear actuator comprising: a stationary reference element; a selectively movable reference element; a plurality of longitudinally expansible members slidably disposed within a common housing between the stationary reference element and the movable reference element; means for limiting the longitudinal extension and contraction of each of the expansible members; means linking each expansible member to the next consecutive expansible member whereby the total displacement of the movable reference element in relation to the stationary reference element is the sum of the individual displacements of the expansible members; biasing means soliciting the expansible members to an extended position; and electric solenoid means for each expansible member whereby said expansible members are selectively caused to contract an amount determined by the limiting means.

5. A linear actuator as claimed in claim 4 wherein the means limiting the longitudinal extension and contraction of each expansible member allows each individual expansible member to extend twice the amount of the next preceding expansible member.

6. A positioner for linearly positioning a movable reference element in relation to a stationary reference element, said positioner comprising: a stationary housing defining the stationary reference element; a plurality of stages slidably linked end-to-end within a bore in the housing; each of the stages comprising two members which are a first hollow member adapted to be displaced only by the linear displacement of the second member of the immediately preceding stage and a second member adapted to be coaxially displaced within said first member; means rigidly connecting the second member of a stage to the first member of the next consecutive stage; means limiting the travel of the second member in relation to the first member of each motor stage; electric solenoid means about each first member to cause said respective second member to be linearly displaced upon application of an electric current; means to exert a biasing action between the stages; and means rigidly connecting the second member of the last stage to the movable reference element.

7. A positioner as claimed in claim 6 in which the means limiting the travel of the second member in relation to the first member of each of the stages limits the travel of said second member to a value which is twice the travel of the second member of the immediately preceding stage in relation to the first member of said immediately preceding stage.

8. A positioner comprising in combination: a housing; an output member projecting through one end of the housing and capable of being positioned to any one of a plurality of discrete positions; a plurality of stages slidably disposed end-to-end within a longitudinal bore in the housing; linking means connecting all the stages in a consecutive manner, the first of said stages being rigidly connected to the output member and the last of said stages being affixed to the housing proximate the end thereof farthest removed from said output member; each of the stages comprising a hollow cylindrical core member, an electric solenoid coil wound around said core member, a plunger member having one end coaxially disposed within said core member and another end rigidly affixed to the next hollow cylindrical core member, first abutting means preventing said plunger member from escaping from said core member, second abutting means limiting the permissible stroke of said plunger member within said core member; biasing means normally maintaining said plunger member engaged with said first abutting means; and switching means to selectively apply electrical signals to any number of electric solenoid coils for for the purpose of displacing the output member of a distance corresponding to the sum of the strokes of the individual plunger members actuated by said electric solenoid coils.

9. A positioner as claimed in claim 8 in which the abutting means limiting the stroke of the plunger member within the core member of each stage allows the plunger member to travel a distance which is twice the distance defined by the abutting means of the immediately preceding stage.

10. A positioner as claimed in claim 8 in which the output member is maintained stationary and the housing is movable.

11. A linear actautor as claimed in claim 8 in which the linear position of the output member in relation to the housing represents the analogue equivalent of a binary number.

References Cited by the Examiner

UNITED STATES PATENTS 1,799,784 4/1931 Donnellan ---------- 235—92

ORIS L. RADER, *Primary Examiner.*

MILTON O. HIRSHFIELD, *Examiner.*